(12) United States Patent
Imes et al.

(10) Patent No.: US 10,129,383 B2
(45) Date of Patent: Nov. 13, 2018

(54) HOME MANAGEMENT SYSTEM AND METHOD

(71) Applicant: SAMSUNG ELECTRONICS CO., LTD., Suwon-si, Gyeonggi-do (KR)

(72) Inventors: Kevin R. Imes, Austin, TX (US); James Hollister, Round Rock, TX (US); John Cottrell, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/590,521

(22) Filed: Jan. 6, 2015

(65) Prior Publication Data

US 2015/0195100 A1    Jul. 9, 2015

Related U.S. Application Data (60) Provisional application No. 61/924,048, filed on Jan. 6, 2014.

(51) Int. Cl.
| | |
|---|---|
| *H04M 3/00* | (2006.01) |
| *H04M 1/725* | (2006.01) |
| *H04W 4/04* | (2009.01) |
| *H04W 4/02* | (2018.01) |
| *H04L 29/08* | (2006.01) |

(Continued)

(52) U.S. Cl.
CPC ........ *H04M 1/72533* (2013.01); *G05B 15/02* (2013.01); *H04L 12/282* (2013.01); *H04L 12/2803* (2013.01); *H04L 12/2823* (2013.01); *H04L 12/2827* (2013.01); *H04L 12/2838* (2013.01); *H04L 67/125* (2013.01); *H04W 4/023* (2013.01); *H04W 4/043* (2013.01); *H04W 4/80* (2018.02); *G05B 2219/2642* (2013.01);

(Continued)

(58) Field of Classification Search
CPC .......... H04M 1/72533; H04M 1/72572; H04L 12/2838; H04L 12/282; H04L 2012/2841; H04W 4/023; H04W 4/043
USPC ....................................... 455/420
See application file for complete search history.

(56) References Cited

U.S. PATENT DOCUMENTS

| | | | |
|---|---|---|---|
| 1,568,584 | A | 1/1926 | Blankenship |
| 2,042,633 | A | 6/1936 | Richardson |

(Continued)

FOREIGN PATENT DOCUMENTS

| | | |
|---|---|---|
| EP | 1814260 A2 | 8/2007 |
| JP | H0879840 A | 3/1996 |

(Continued)

OTHER PUBLICATIONS

International Search Report, dated Apr. 30, 2015, 4 pages.

(Continued)

*Primary Examiner* — Tanmay Shah
(74) *Attorney, Agent, or Firm* — Staas & Halsey LLP (57) ABSTRACT

A home management system includes a first network device and a second network device in wireless communication with said first network device. The home management system also includes at least one zone. At least one sensor is disposed in the zone. The sensor is in wireless communication with the first network device to detect the presence of the first network device in the zone. Additionally, the sensor is in wireless communication with the second network device to control the second network device in response to instructions from the first network device.

21 Claims, 4 Drawing Sheets

(51) Int. Cl.
   *G05B 15/02* (2006.01)
   *H04W 4/80* (2018.01)
   *H04L 12/28* (2006.01)

(52) U.S. Cl.
   CPC . *H04L 2012/2841* (2013.01); *H04M 1/72572* (2013.01)

(56) References Cited

U.S. PATENT DOCUMENTS

| | | | |
|---|---|---|---|
| 2,427,965 A | 9/1947 | Henderson |
| 2,931,006 A | 3/1960 | Klumpp, Jr. |
| 2,960,677 A | 11/1960 | Stearn et al. |
| 3,194,957 A | 7/1965 | Caldwell et al. |
| 3,237,148 A | 2/1966 | Ege |
| 3,531,759 A | 9/1970 | Hansen |
| 3,675,183 A | 7/1972 | Drake |
| 3,808,602 A | 4/1974 | Hoeffel et al. |
| 4,407,447 A | 10/1983 | Sayegh |
| 4,437,716 A | 3/1984 | Cooper |
| 4,497,031 A | 1/1985 | Froehling et al. |
| 4,645,286 A | 2/1987 | Isban et al. |
| 5,127,575 A | 7/1992 | Beerbaum |
| 5,274,571 A | 12/1993 | Hesse et al. |
| 5,289,362 A | 2/1994 | Liebl et al. |
| 5,461,390 A | 10/1995 | Hoshen |
| 5,476,221 A | 12/1995 | Seymour |
| 5,537,339 A | 7/1996 | Naganuma et al. |
| 5,544,036 A | 8/1996 | Brown, Jr. et al. |
| 5,566,084 A | 10/1996 | Cmar |
| 5,595,342 A | 1/1997 | McNair et al. |
| 5,682,949 A | 11/1997 | Ratcliffe et al. |
| 5,725,148 A | 3/1998 | Hartman |
| 5,729,442 A | 3/1998 | Frantz |
| 5,764,146 A | 6/1998 | Baldwin et al. |
| 5,812,949 A | 9/1998 | Taketsugu |
| 5,819,840 A | 10/1998 | Wilson et al. |
| 5,884,072 A | 3/1999 | Rasmussen |
| 5,964,625 A | 10/1999 | Farley |
| 5,987,379 A | 11/1999 | Smith |
| 6,014,080 A | 1/2000 | Layson, Jr. |
| 6,073,019 A | 6/2000 | Lowdon |
| 6,108,614 A | 8/2000 | Lincoln et al. |
| 6,128,661 A | 10/2000 | Flanagin et al. |
| 6,175,078 B1 | 1/2001 | Bambardekar et al. |
| 6,353,180 B1 | 3/2002 | Debartolo, Jr. et al. |
| 6,400,956 B1 | 6/2002 | Richton |
| 6,442,639 B1 | 8/2002 | McElhattan |
| 6,478,233 B1 | 11/2002 | Shah |
| 6,483,028 B2 | 11/2002 | Debartolo, Jr. et al. |
| 6,553,418 B1 | 4/2003 | Collins et al. |
| 6,623,311 B1 | 9/2003 | Dehan |
| 6,636,893 B1 | 10/2003 | Fong |
| 6,684,087 B1 | 1/2004 | Yu et al. |
| 6,785,542 B1 | 8/2004 | Blight et al. |
| 6,785,630 B2 | 8/2004 | Kolk et al. |
| 6,850,252 B1 | 2/2005 | Hoffberg |
| 6,868,293 B1 | 3/2005 | Schurr et al. |
| 6,975,958 B2 | 12/2005 | Bohrer et al. |
| 6,976,366 B2 | 12/2005 | Starling et al. |
| 6,980,659 B1 | 12/2005 | Barnum |
| 6,999,757 B2 | 2/2006 | Bates et al. |
| 7,016,751 B2 | 3/2006 | Nordquist et al. |
| 7,031,945 B1 | 4/2006 | Donner |
| 7,082,460 B2 | 7/2006 | Hansen et al. |
| 7,083,109 B2 | 8/2006 | Pouchak |
| 7,099,483 B2 | 8/2006 | Inagaki |
| 7,114,554 B2 | 10/2006 | Bergman et al. |
| 7,127,328 B2 | 10/2006 | Ransom |
| 7,127,734 B1 | 10/2006 | Amit |
| 7,130,719 B2 | 10/2006 | Ehlers et al. |
| 7,139,564 B2 | 11/2006 | Hebert |
| 7,140,551 B2 | 11/2006 | De Pauw et al. |
| 7,155,305 B2 | 12/2006 | Hayes et al. |
| 7,159,789 B2 | 1/2007 | Schwendinger et al. |
| 7,188,003 B2 | 3/2007 | Ransom et al. |
| 7,197,011 B2 | 3/2007 | Fong |
| 7,216,021 B2 | 5/2007 | Matsubara et al. |
| 7,222,800 B2 | 5/2007 | Wruck |
| 7,224,966 B2 | 5/2007 | Caspi et al. |
| 7,257,397 B2 | 8/2007 | Shamoon et al. |
| 7,343,226 B2 | 3/2008 | Ehlers et al. |
| 7,349,761 B1 | 3/2008 | Cruse |
| 7,363,053 B2 | 4/2008 | Dalton et al. |
| 7,403,838 B2 | 7/2008 | Deen et al. |
| 7,444,401 B1 | 10/2008 | Keyghobad et al. |
| 7,451,017 B2 | 11/2008 | McNally |
| 7,460,827 B2 | 12/2008 | Schuster et al. |
| 7,477,617 B2 | 1/2009 | Chen et al. |
| 7,510,126 B2 | 3/2009 | Rossi et al. |
| 7,525,425 B2 | 4/2009 | Diem |
| 7,526,539 B1 | 4/2009 | Hsu |
| 7,554,437 B2 | 6/2009 | Axelsen |
| 7,565,225 B2 | 7/2009 | Dushane |
| 7,567,844 B2 | 7/2009 | Thomas et al. |
| 7,574,208 B2 | 8/2009 | Hanson et al. |
| 7,574,283 B2 | 8/2009 | Wang et al. |
| 7,590,703 B2 | 9/2009 | Cashman et al. |
| 7,644,591 B2 | 1/2010 | Singh et al. |
| 7,665,670 B2 | 2/2010 | Ahmed |
| 7,668,532 B2 | 2/2010 | Shamoon et al. |
| 7,671,544 B2 | 3/2010 | Clark et al. |
| 7,693,581 B2 | 4/2010 | Callaghan et al. |
| 7,706,928 B1 | 4/2010 | Howell et al. |
| 7,715,951 B2 | 5/2010 | Forbes et al. |
| 7,747,739 B2 | 6/2010 | Bridges et al. |
| 7,752,309 B2 | 7/2010 | Keyghobad et al. |
| 7,761,910 B2 | 7/2010 | Ransom |
| 7,775,453 B2 | 8/2010 | Hara |
| 7,783,738 B2 | 8/2010 | Keyghobad et al. |
| 7,792,946 B2 | 9/2010 | Keyghobad et al. |
| 7,798,417 B2 | 9/2010 | Snyder et al. |
| 7,812,766 B2 | 10/2010 | Leblanc et al. |
| 7,813,831 B2 | 10/2010 | McCoy et al. |
| 7,865,252 B2 | 1/2011 | Clayton |
| 7,881,816 B2 | 2/2011 | Mathiesen et al. |
| 7,884,727 B2 | 2/2011 | Iran |
| 7,886,166 B2 | 2/2011 | Schnekendorf et al. |
| 7,895,257 B2 | 2/2011 | Helal et al. |
| 7,908,019 B2 | 3/2011 | Ebrom et al. |
| 7,908,116 B2 | 3/2011 | Steinberg et al. |
| 7,908,117 B2 | 3/2011 | Steinberg et al. |
| 7,912,559 B2 | 3/2011 | McCoy et al. |
| 7,917,914 B2 | 3/2011 | McCoy et al. |
| 7,918,406 B2 | 4/2011 | Rosen |
| 7,921,429 B2 | 4/2011 | McCoy et al. |
| 7,941,530 B2 | 5/2011 | Ha et al. |
| 7,949,615 B2 | 5/2011 | Ehlers et al. |
| 7,953,518 B2 | 5/2011 | Kansal et al. |
| 7,973,707 B2 | 7/2011 | Verechtchiagine |
| 7,975,051 B2 | 7/2011 | Saint Clair et al. |
| 7,979,163 B2 | 7/2011 | Terlson et al. |
| 8,005,780 B2 | 8/2011 | McCoy et al. |
| 8,010,237 B2 | 8/2011 | Cheung et al. |
| 8,010,418 B1 | 8/2011 | Lee |
| 8,010,812 B2 | 8/2011 | Forbes, Jr. et al. |
| 8,019,445 B2 | 9/2011 | Marhoefer |
| 8,024,073 B2 | 9/2011 | Imes et al. |
| 8,028,049 B1 | 9/2011 | Ellis et al. |
| 8,028,302 B2 | 9/2011 | Glotzbach et al. |
| 8,032,233 B2 | 10/2011 | Forbes, Jr. et al. |
| 8,042,048 B2 | 10/2011 | Wilson et al. |
| 8,049,592 B2 | 11/2011 | Wang et al. |
| 8,063,775 B2 | 11/2011 | Reed et al. |
| 8,082,065 B2 | 12/2011 | Imes et al. |
| 8,090,477 B1 | 1/2012 | Steinberg |
| 8,091,765 B2 | 1/2012 | Jiang et al. |
| 8,091,795 B1 | 1/2012 | McLellan et al. |
| 8,099,195 B2 | 1/2012 | Imes et al. |
| 8,099,198 B2 | 1/2012 | Gurin |
| 8,108,076 B2 | 1/2012 | Imes et al. |
| 8,117,299 B2 | 2/2012 | Narayanaswami et al. |
| 8,126,685 B2 | 2/2012 | Nasle |
| 8,131,401 B2 | 3/2012 | Nasle |
| 8,140,279 B2 | 3/2012 | Subbloie |

(56) References Cited

U.S. PATENT DOCUMENTS

| | | |
|---|---|---|
| 8,140,667 B2 | 3/2012 | Keyghobad et al. |
| 8,176,112 B2 | 5/2012 | Hicks, IIII et al. |
| 8,204,979 B2 | 6/2012 | Vutharkar et al. |
| 8,214,270 B2 | 7/2012 | Schaefer et al. |
| 8,280,556 B2 | 10/2012 | Besore et al. |
| 8,306,634 B2 | 11/2012 | Nguyen et al. |
| 8,350,694 B1 | 1/2013 | Trundle et al. |
| 8,355,865 B2 | 1/2013 | Wagner et al. |
| 8,406,783 B2 | 3/2013 | Eitan et al. |
| 8,406,933 B2 | 3/2013 | Nagel et al. |
| 2002/0073217 A1 | 6/2002 | Ma et al. |
| 2002/0147006 A1 | 10/2002 | Coon et al. |
| 2002/0194500 A1 | 12/2002 | Bajikar |
| 2002/0196151 A1 | 12/2002 | Troxler |
| 2002/0198984 A1 | 12/2002 | Goldstein et al. |
| 2003/0120817 A1 | 6/2003 | Ott et al. |
| 2003/0122684 A1 | 7/2003 | Porter et al. |
| 2003/0149734 A1 | 8/2003 | Aaltonen et al. |
| 2003/0210126 A1 | 11/2003 | Kanazawa |
| 2004/0034484 A1 | 2/2004 | Solomita, Jr. et al. |
| 2004/0078153 A1 | 4/2004 | Bartone et al. |
| 2004/0087314 A1 | 5/2004 | Duncan |
| 2004/0119600 A1 | 6/2004 | Hampton |
| 2004/0133314 A1 | 7/2004 | Ehlers et al. |
| 2004/0193329 A1 | 9/2004 | Ransom et al. |
| 2005/0038326 A1 | 2/2005 | Mathur |
| 2005/0040247 A1 | 2/2005 | Pouchak |
| 2005/0040250 A1 | 2/2005 | Wruck |
| 2005/0044427 A1 | 2/2005 | Dunstan et al. |
| 2005/0060575 A1 | 3/2005 | Trethewey et al. |
| 2005/0090267 A1 | 4/2005 | Kotzin |
| 2005/0131583 A1 | 6/2005 | Ransom |
| 2005/0143863 A1 | 6/2005 | Ruane et al. |
| 2005/0144437 A1 | 6/2005 | Ransom et al. |
| 2005/0172056 A1 | 8/2005 | Ahn |
| 2005/0194457 A1 | 9/2005 | Dolan |
| 2005/0242945 A1 | 11/2005 | Perkinson |
| 2005/0246561 A1 | 11/2005 | Wu et al. |
| 2006/0012489 A1 | 1/2006 | Yokota et al. |
| 2006/0063522 A1 | 3/2006 | McFarland |
| 2006/0097063 A1 | 5/2006 | Zeevi |
| 2006/0099971 A1 | 5/2006 | Staton et al. |
| 2006/0102732 A1 | 5/2006 | Garrett et al. |
| 2006/0122715 A1 | 6/2006 | Schroeder et al. |
| 2006/0161635 A1 | 7/2006 | Lamkin et al. |
| 2006/0179079 A1 | 8/2006 | Kolehmainen |
| 2006/0253894 A1 | 11/2006 | Bookman et al. |
| 2006/0265489 A1 | 11/2006 | Moore |
| 2006/0276175 A1 | 12/2006 | Chandran |
| 2006/0283965 A1 | 12/2006 | Mueller et al. |
| 2007/0032225 A1 | 2/2007 | Konicek et al. |
| 2007/0037554 A1 | 2/2007 | Feeny |
| 2007/0037605 A1 | 2/2007 | Logan |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0054616 A1 | 3/2007 | Culbert |
| 2007/0055760 A1 | 3/2007 | McCoy et al. |
| 2007/0060171 A1 | 3/2007 | Sudit et al. |
| 2007/0061050 A1 | 3/2007 | Hoffknecht |
| 2007/0061266 A1 | 3/2007 | Moore et al. |
| 2007/0061487 A1 | 3/2007 | Moore et al. |
| 2007/0112939 A1 | 5/2007 | Wilson et al. |
| 2007/0114295 A1 | 5/2007 | Jenkins |
| 2007/0115902 A1 | 5/2007 | Shamoon et al. |
| 2007/0124026 A1 | 5/2007 | Troxell et al. |
| 2007/0136217 A1 | 6/2007 | Johnson et al. |
| 2007/0155401 A1 | 7/2007 | Ward et al. |
| 2007/0156265 A1 | 7/2007 | McCoy et al. |
| 2007/0156864 A1 | 7/2007 | McCoy et al. |
| 2007/0156882 A1 | 7/2007 | McCoy et al. |
| 2007/0158442 A1 | 7/2007 | Chapman et al. |
| 2007/0160022 A1 | 7/2007 | McCoy et al. |
| 2007/0162158 A1 | 7/2007 | McCoy et al. |
| 2007/0168486 A1 | 7/2007 | McCoy et al. |
| 2007/0176771 A1 | 8/2007 | Doyle |
| 2007/0188319 A1 | 8/2007 | Upton |
| 2007/0197236 A1 | 8/2007 | Ahn et al. |
| 2007/0221741 A1 | 9/2007 | Wagner et al. |
| 2007/0240173 A1 | 10/2007 | McCoy et al. |
| 2007/0241203 A1 | 10/2007 | Wagner et al. |
| 2007/0249319 A1 | 10/2007 | Faulkner et al. |
| 2007/0273307 A1 | 11/2007 | Westrick et al. |
| 2007/0274241 A1 | 11/2007 | Brothers |
| 2007/0282748 A1 | 12/2007 | Saint Clair et al. |
| 2007/0285510 A1 | 12/2007 | Lipton et al. |
| 2007/0287410 A1 | 12/2007 | Bae et al. |
| 2007/0287473 A1 | 12/2007 | Dupary |
| 2007/0288610 A1 | 12/2007 | Saint Clair et al. |
| 2007/0288975 A1 | 12/2007 | Cashman et al. |
| 2008/0004904 A1 | 1/2008 | Tran |
| 2008/0017722 A1 | 1/2008 | Snyder et al. |
| 2008/0046878 A1 | 2/2008 | Anderson |
| 2008/0082838 A1 | 4/2008 | Achariyakosol et al. |
| 2008/0099568 A1 | 5/2008 | Nicodem et al. |
| 2008/0103610 A1 | 5/2008 | Ebrom et al. |
| 2008/0104208 A1 | 5/2008 | Ebrom et al. |
| 2008/0104212 A1 | 5/2008 | Ebrom et al. |
| 2008/0109830 A1 | 5/2008 | Giozbach et al. |
| 2008/0127325 A1 | 5/2008 | Ebrom et al. |
| 2008/0137670 A1 | 6/2008 | Ebrom et al. |
| 2008/0177678 A1 | 7/2008 | Di Martini et al. |
| 2008/0177994 A1 | 7/2008 | Mayer |
| 2008/0188963 A1 | 8/2008 | McCoy |
| 2008/0218307 A1 | 9/2008 | Schoettle |
| 2008/0219186 A1 | 9/2008 | Bell et al. |
| 2008/0219227 A1 | 9/2008 | Michaelis |
| 2008/0219239 A1 | 9/2008 | Bell et al. |
| 2008/0221737 A1 | 9/2008 | Josephson et al. |
| 2008/0249642 A1 | 10/2008 | Chen |
| 2008/0262820 A1 | 10/2008 | Nasle |
| 2008/0270562 A1 | 10/2008 | Jin et al. |
| 2008/0271123 A1 | 10/2008 | Ollis et al. |
| 2008/0272934 A1 | 11/2008 | Wang et al. |
| 2008/0277486 A1 | 11/2008 | Seem et al. |
| 2008/0277487 A1 | 11/2008 | Mueller et al. |
| 2008/0281472 A1 | 11/2008 | Podgorny et al. |
| 2008/0281666 A1 | 11/2008 | Kessman et al. |
| 2008/0291855 A1 | 11/2008 | Bata et al. |
| 2008/0305644 A1 | 12/2008 | Noda et al. |
| 2008/0313310 A1 | 12/2008 | Vasa et al. |
| 2009/0001182 A1 | 1/2009 | Siddaramanna et al. |
| 2009/0005061 A1 | 1/2009 | Ward et al. |
| 2009/0012704 A1 | 1/2009 | Franco et al. |
| 2009/0037938 A1 | 2/2009 | Frank |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. et al. |
| 2009/0065596 A1 | 3/2009 | Seem et al. |
| 2009/0070436 A1 | 3/2009 | Dawes et al. |
| 2009/0076749 A1 | 3/2009 | Nasle |
| 2009/0082888 A1 | 3/2009 | Johansen |
| 2009/0083167 A1 | 3/2009 | Subbloie |
| 2009/0093688 A1 | 4/2009 | Mathur |
| 2009/0098857 A1 | 4/2009 | De Atley |
| 2009/0098880 A1 | 4/2009 | Lindquist |
| 2009/0100492 A1 | 4/2009 | Hicks, III et al. |
| 2009/0103535 A1 | 4/2009 | McCoy et al. |
| 2009/0112522 A1 | 4/2009 | Rasmussen |
| 2009/0113037 A1 | 4/2009 | Pouchak |
| 2009/0129301 A1 | 5/2009 | Belimpasakis |
| 2009/0132070 A1 | 5/2009 | Ebrom et al. |
| 2009/0135836 A1 | 5/2009 | Veillette |
| 2009/0138099 A1 | 5/2009 | Veillette |
| 2009/0157529 A1 | 6/2009 | Ehlers et al. |
| 2009/0160626 A1 | 6/2009 | Jeon et al. |
| 2009/0164049 A1 | 6/2009 | Nibler et al. |
| 2009/0187499 A1 | 7/2009 | Mulder et al. |
| 2009/0193217 A1 | 7/2009 | Korecki et al. |
| 2009/0195349 A1 | 8/2009 | Frader-Thompson et al. |
| 2009/0204837 A1 | 8/2009 | Raval et al. |
| 2009/0240381 A1 | 9/2009 | Lane |
| 2009/0248702 A1 | 10/2009 | Schwartz et al. |
| 2009/0267787 A1 | 10/2009 | Pryor et al. |

(56) References Cited

U.S. PATENT DOCUMENTS

| | | |
|---|---|---|
| 2009/0270138 A1 | 10/2009 | Raveendran |
| 2009/0302994 A1 | 12/2009 | Rhee et al. |
| 2009/0305644 A1 | 12/2009 | Rhee et al. |
| 2009/0312968 A1 | 12/2009 | Phillips et al. |
| 2009/0316671 A1 | 12/2009 | Rolf et al. |
| 2010/0017126 A1 | 1/2010 | Holcman et al. |
| 2010/0034386 A1 | 2/2010 | Choong et al. |
| 2010/0035587 A1 | 2/2010 | Bennett |
| 2010/0035613 A1 | 2/2010 | Schroter |
| 2010/0063867 A1 | 3/2010 | Proctor, Jr. et al. |
| 2010/0066507 A1 | 3/2010 | Myllymaeki |
| 2010/0069035 A1 | 3/2010 | Johnson |
| 2010/0069087 A1 | 3/2010 | Chow et al. |
| 2010/0070100 A1 | 3/2010 | Finlinson et al. |
| 2010/0070101 A1 | 3/2010 | Benes et al. |
| 2010/0075656 A1 | 3/2010 | Howarter et al. |
| 2010/0081375 A1 | 4/2010 | Rosenblatt et al. |
| 2010/0081468 A1 | 4/2010 | Brothers |
| 2010/0082174 A1 | 4/2010 | Weaver |
| 2010/0082176 A1 | 4/2010 | Chang |
| 2010/0082431 A1 | 4/2010 | Ramer et al. |
| 2010/0087932 A1 | 4/2010 | McCoy et al. |
| 2010/0088261 A1 | 4/2010 | Montalvo |
| 2010/0094475 A1 | 4/2010 | Masters et al. |
| 2010/0094737 A1 | 4/2010 | Lambird |
| 2010/0099410 A1* | 4/2010 | Sweeney ............... H04W 4/02 455/435.1 |
| 2010/0100253 A1 | 4/2010 | Fausak et al. |
| 2010/0113061 A1 | 5/2010 | Holcman |
| 2010/0115314 A1 | 5/2010 | Sultenfuss |
| 2010/0121499 A1 | 5/2010 | Besore et al. |
| 2010/0123414 A1 | 5/2010 | Antonopoulos |
| 2010/0127854 A1 | 5/2010 | Helvick et al. |
| 2010/0127889 A1 | 5/2010 | Vogel et al. |
| 2010/0130178 A1 | 5/2010 | Bennett et al. |
| 2010/0130213 A1 | 5/2010 | Vendrow et al. |
| 2010/0138764 A1 | 6/2010 | Hatambeiki et al. |
| 2010/0141437 A1 | 6/2010 | Karam et al. |
| 2010/0145534 A1 | 6/2010 | Forbes, Jr. et al. |
| 2010/0152997 A1 | 6/2010 | De Silva et al. |
| 2010/0156665 A1 | 6/2010 | Krzyzanowski et al. |
| 2010/0159936 A1 | 6/2010 | Brisbois et al. |
| 2010/0161148 A1 | 6/2010 | Forbes, Jr. et al. |
| 2010/0161149 A1 | 6/2010 | Nguyen et al. |
| 2010/0164713 A1 | 7/2010 | Wedig et al. |
| 2010/0165861 A1 | 7/2010 | Rrdland et al. |
| 2010/0169030 A1 | 7/2010 | Parlos et al. |
| 2010/0174643 A1 | 7/2010 | Schaefer et al. |
| 2010/0179670 A1 | 7/2010 | Forbes, Jr. et al. |
| 2010/0179672 A1 | 7/2010 | Beckmann et al. |
| 2010/0179708 A1 | 7/2010 | Watson et al. |
| 2010/0187219 A1 | 7/2010 | Besore et al. |
| 2010/0188239 A1 | 7/2010 | Rockwell |
| 2010/0188279 A1 | 7/2010 | Shamilian et al. |
| 2010/0191352 A1 | 7/2010 | Quail |
| 2010/0193592 A1 | 8/2010 | Simon et al. |
| 2010/0198713 A1 | 8/2010 | Forbes, Jr. et al. |
| 2010/0207728 A1 | 8/2010 | Roscoe et al. |
| 2010/0217450 A1 | 8/2010 | Beal et al. |
| 2010/0217451 A1 | 8/2010 | Kouda et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crabtree et al. |
| 2010/0217651 A1 | 8/2010 | Crabtree et al. |
| 2010/0217837 A1 | 8/2010 | Ansari et al. |
| 2010/0218108 A1 | 8/2010 | Crabtree et al. |
| 2010/0222935 A1 | 9/2010 | Forbes, Jr. et al. |
| 2010/0228854 A1 | 9/2010 | Morrison et al. |
| 2010/0235008 A1 | 9/2010 | Forbes, Jr. et al. |
| 2010/0241275 A1 | 9/2010 | Crawford et al. |
| 2010/0249955 A1 | 9/2010 | Sitton |
| 2010/0250590 A1 | 9/2010 | Galvin |
| 2010/0256823 A1 | 10/2010 | Cherukuri et al. |
| 2010/0257539 A1 | 10/2010 | Narayanan et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0262336 A1 | 10/2010 | Rivas et al. |
| 2010/0272192 A1 | 10/2010 | Varadarajan et al. |
| 2010/0289643 A1* | 11/2010 | Trundle ............... F24F 11/0086 340/545.1 |
| 2010/0299265 A1 | 11/2010 | Walters et al. |
| 2010/0299517 A1 | 11/2010 | Jukic et al. |
| 2010/0305773 A1 | 12/2010 | Cohen |
| 2010/0315235 A1 | 12/2010 | Adegoke et al. |
| 2010/0315438 A1 | 12/2010 | Horodezky et al. |
| 2010/0317332 A1 | 12/2010 | Bathiche et al. |
| 2010/0317371 A1 | 12/2010 | Westerinen et al. |
| 2010/0318198 A1 | 12/2010 | Smith et al. |
| 2010/0324956 A1 | 12/2010 | Lopez et al. |
| 2010/0324962 A1 | 12/2010 | Nesler et al. |
| 2010/0332373 A1 | 12/2010 | Crabtree et al. |
| 2011/0004350 A1 | 1/2011 | Cheifetz et al. |
| 2011/0004355 A1 | 1/2011 | Wang et al. |
| 2011/0004513 A1 | 1/2011 | Hoffberg |
| 2011/0015797 A1 | 1/2011 | Gilstrap |
| 2011/0015802 A1 | 1/2011 | Imes |
| 2011/0016023 A1 | 1/2011 | Zakas |
| 2011/0022239 A1 | 1/2011 | Forbes, Jr. et al. |
| 2011/0022242 A1 | 1/2011 | Bukhin et al. |
| 2011/0029655 A1 | 2/2011 | Forbes, Jr. et al. |
| 2011/0039518 A1 | 2/2011 | Maria |
| 2011/0040666 A1 | 2/2011 | Crabtree et al. |
| 2011/0046792 A1* | 2/2011 | Imes ............... F24F 11/0086 700/278 |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0047482 A1 | 2/2011 | Arthurs et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0061014 A1 | 3/2011 | Frader-Thompson et al. |
| 2011/0063126 A1 | 3/2011 | Kennedy et al. |
| 2011/0063999 A1 | 3/2011 | Erdmann et al. |
| 2011/0069719 A1 | 3/2011 | Fries, IV et al. |
| 2011/0077789 A1 | 3/2011 | Sun |
| 2011/0098869 A1 | 4/2011 | Seo et al. |
| 2011/0106326 A1 | 5/2011 | Anunobi et al. |
| 2011/0106327 A1 | 5/2011 | Zhou et al. |
| 2011/0106681 A1 | 5/2011 | Cockerell et al. |
| 2011/0113090 A1 | 5/2011 | Peeri |
| 2011/0115875 A1 | 5/2011 | Sadwick et al. |
| 2011/0117878 A1 | 5/2011 | Barash et al. |
| 2011/0117927 A1 | 5/2011 | Doyle |
| 2011/0138024 A1 | 6/2011 | Chen et al. |
| 2011/0148626 A1 | 6/2011 | Acevedo |
| 2011/0153525 A1 | 6/2011 | Benco et al. |
| 2011/0160881 A1 | 6/2011 | Grey |
| 2011/0172837 A1 | 7/2011 | Forbes, Jr. |
| 2011/0173542 A1 | 7/2011 | Imes et al. |
| 2011/0181412 A1* | 7/2011 | Alexander ........... G05B 19/042 340/541 |
| 2011/0202185 A1 | 8/2011 | Imes et al. |
| 2011/0202195 A1 | 8/2011 | Finch et al. |
| 2011/0202293 A1 | 8/2011 | Kobraei et al. |
| 2011/0211584 A1 | 9/2011 | Mahmoud |
| 2011/0214060 A1 | 9/2011 | Imes et al. |
| 2011/0224838 A1 | 9/2011 | Imes et al. |
| 2011/0227704 A1 | 9/2011 | Padmanabhan et al. |
| 2011/0231020 A1 | 9/2011 | Ramachandran et al. |
| 2011/0246606 A1 | 10/2011 | Barbeau et al. |
| 2011/0246898 A1 | 10/2011 | Imes et al. |
| 2011/0251725 A1 | 10/2011 | Chan |
| 2011/0257809 A1 | 10/2011 | Forbes, Jr. et al. |
| 2011/0258022 A1 | 10/2011 | Forbes, Jr. et al. |
| 2011/0264290 A1 | 10/2011 | Drew |
| 2011/0264296 A1 | 10/2011 | Drake et al. |
| 2011/0282497 A1 | 11/2011 | Josephson et al. |
| 2011/0295393 A1 | 12/2011 | Lindahl |
| 2011/0296169 A1 | 12/2011 | Palmer |
| 2011/0302431 A1 | 12/2011 | Diab et al. |

(56) References Cited

U.S. PATENT DOCUMENTS

| | | | |
|---|---|---|---|
| 2011/0307101 A1 | 12/2011 | Imes et al. | |
| 2011/0316664 A1 | 12/2011 | Olcott et al. | |
| 2012/0022709 A1 | 1/2012 | Taylor | |
| 2012/0061480 A1 | 3/2012 | Deligiannis et al. | |
| 2012/0126020 A1 | 5/2012 | Filson et al. | |
| 2012/0169249 A1 | 7/2012 | Loveland et al. | |
| 2012/0179547 A1 | 7/2012 | Besore et al. | |
| 2012/0189140 A1 | 7/2012 | Hughes et al. | |
| 2012/0278638 A1* | 11/2012 | Wang | G06F 1/1677 713/320 |
| 2012/0312874 A1 | 12/2012 | Jonsson | |
| 2013/0087629 A1 | 4/2013 | Stefanski et al. | |
| 2013/0099010 A1 | 4/2013 | Filson et al. | |
| 2015/0204551 A1* | 7/2015 | Nair | F24F 3/00 165/217 |

FOREIGN PATENT DOCUMENTS

| | | |
|---|---|---|
| JP | 2006092035 A | 4/2006 |
| WO | 2002027639 A1 | 4/2002 |
| WO | 2007109557 A2 | 9/2007 |
| WO | 2008134460 A1 | 11/2008 |
| WO | 2009034720 A1 | 3/2009 |
| WO | 2009036764 A2 | 3/2009 |
| WO | 2009067251 A1 | 5/2009 |
| WO | 2009097400 A1 | 8/2009 |

OTHER PUBLICATIONS

Slavin, Alison Jane and Trundle, Stephen Scott, Remote Thermostat Control/Energy Monitoring, U.S. Appl. No. 61/179,224, filed May 18, 2009; 14 pages.

Gupta, Manu, A Persuasive Gps-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.

Gupta, Manu, Intille, Stephen S. and Larson, Kent, Adding GPS-Control to Traditional Thermostats: An Exploration of Potential Energy Savings and Design Challenges. House_n. Massachusetts Institute of Technology, Cambridge, MA 02142 USA. May 11-14, 2009, Springer-Verlag Berlin, Heideberg.

"A step-by-step guide to installing the 1st generation Nest Learning Thermostat," Article #1161, 2013 Nest Labs. pp. 1-6. http://http://support.nest.com/article/A-step-by-step-guide-to-installing-the-1st-generation-Nest-Learning-Thermostat, last accessed Feb. 1, 2013.

Klym et al., The Evolution of RFID Networks: The Potential for Disruptive Innovation, Mar. 2006, MIT Communication Futures Program, pp. 1-20.

Pering et al., Spontaneous Marriages of Mobile Devices and Interactive Space, Communication of the ACM, Sep. 2005, pp. 53-59.

Jaring et al., Improving Mobile Solution Workflows and Usability Using Near Field Communication Technology, 2007, Springer-Verlag Berlin Heidelberg, pp. 358-373.

"Wi-Fi", Wikipedia, printed Jul. 8, 2013.

Request Response, Wikipedia, printed Jul. 25, 2013.

Inncom International, Inc. "Installation User Manual", Revision 3.1, Sep. 12, 2006, pp. 1-36.

Peffer, T., et al. "A Tale of Two Houses: The Human Dimension of Demand Response Enabling Technology from a Case Study of an Adaptive Wireless Thermostat," ACEEE Summer Study on Energy Efficiency in Buildings, 2008.

BAYweb Thermostat Owner's Manual, Bay Controls, LLC, published Nov. 11, 2009.

Stigge, B. "Informed Home Energy Behavior: Developing a tool for homeowners to monitor, plan and learn about energy conservation," Massachusetts Institute of Technology, 2001.

Mozer, M., et al. The Neurothermostat: Predictive Optimal Control of Residential Heating Systems. "Advances in Neural Information Processing Systems 9." MIT Press, 1997.

e4 Smart Digital Thermostat—E529, Inncom by Honeywell, published Aug. 2012.

Seligman, C., et al. Behavior Approaches to Residential Energy Conservation. "Saving Energy in the Home." Ballinger Publishing Co., 1978.

Singapore Written Opinion dated Jun. 9, 2017 in corresponding Singapore Patent Application No. 11201605494Q.

Written Opinion of the Intellectual Property Office of Singapore dated Apr. 24, 2018 in Singapore Patent Application No. 11201605494Q.

Mexican Office Action dated Aug. 15, 2018 (received Sep. 3, 2018) in Mexican Patent Application No. MX/a/2016/008828.

\* cited by examiner

HOME MANAGEMENT SYSTEM AND METHOD

CROSS REFERENCE TO RELATED APPLICATION

This application claims the benefit of and priority to U.S. provisional application Ser. No. 61/924,048 filed Jan. 6, 2014, the entire disclosure of which is incorporated herein by reference.

FIELD OF THE DISCLOSURE

The present disclosure relates generally to home management systems and methods.

BACKGROUND

Home management systems that facilitate energy savings have become popular over recent years. Homeowners have flocked to home improvement stores or have contacted home improvement servicers and utility companies in an effort to become more energy efficient for environmental reasons, financial reasons, or both. As a result, manufacturers and utility companies have developed different home management systems to fulfill homeowner's needs.

Some of these systems have included a device such as an automation controller to monitor and control electronic devices such as lights, curtains, ceiling fans, DVD sources, audio systems, antennas, video tape players, and thermostats utilizing a network within the home. With this system, the homeowner or user must generally select which electronic device to use each time they want to use it and then control its operation through the controller. Other systems include a device such as a proximity sensor used in conjunction with a smart phone to detect when the homeowner is within a certain distance of the home and may alter operation of an electronic device such as a thermostat based on the user's respective location.

While these devices have made homeowners somewhat more energy efficient and have made a contribution to homeowners taking an active role in being more energy efficient, a need for improvement on the current home management systems and methods still exists.

SUMMARY OF THE DISCLOSURE

Accordingly, an improved home management system and method for managing a home management system are provided.

In one aspect, the home management system includes a first network device, a sensor, and a second network device each capable of communicating using at least one wireless technology to allow wireless communication therebetween. More specifically, the first network device, the second network device, and the sensor are configured to communicate wirelessly. A plurality of zones are disposed within the home. The sensor is disposed in one of the zones for detecting the presence of the first network device in one of the zones. The sensor instructs the second network device in response to receiving instructions from the first network device. The second network device is configured to be adjusted in response to receiving instructions from the first network device through the sensor. Therefore, the first network device and the sensor can control the second network device based on the user's presence within the home. The second network device may adjust a setting based on the instructions received from the sensor. Specifically, the sensor can detect the presence of the first network device within a zone or a room within a home utilizing at least one wireless technology. In detecting the first network device, the sensor may gather instructions from the first network device for controlling the second network device. Alternatively, the first network device may generate a first signal indicative of instructions for controlling the second network device when detected by the sensor. The sensor then generates a second signal indicative of instructions for controlling the second network device utilizing at least one wireless technology. The second network device receives the second signal via the at least one wireless technology and adjusts the second network device from a first setting to a second setting accordingly based on the instructions received.

In another aspect, a home management method includes adjusting a first setting of a second network device to a second setting when a sensor detects a user's presence in a zone via a first network device.

The aspects of the system and method disclosed herein provide various advantages. For instance, the system and method prevents the user from having to physically change the settings of devices each time the homeowner is within a specific zone or area of the home. The system and method saves energy by keeping the setting in energy saving mode until the user is detected within that zone. Furthermore, the user may save money by utilizing the energy saving mode within different zones of the home.

BRIEF DESCRIPTION OF THE DRAWINGS

Other aspects of the present disclosure will be readily appreciated, as the same becomes better understood by reference to the following detailed description when considered in connection with the accompanying drawings wherein.

DESCRIPTION OF THE ENABLING EMBODIMENT

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

The aspects disclosed herein provide a home management system and a method of managing a home management system.

Devices or programs that are in communication with one another need not be in continuous communication with each other unless expressly specified otherwise. In addition, devices or programs that are in communication with one another may communicate directly or indirectly through one or more intermediaries.

For purposes of this disclosure, a home management system, a first network device, a second network device, or any combination thereof can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a home management system, a first network device, a second network device, or any combination thereof can include any combination of a personal computer, a PDA, a consumer electronic device, a media device, a smart phone, a cellular or mobile phone, a smart device, a tablet, a television, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device, or any other suitable device or system, and can vary in size, shape, performance, functionality, and price.

For purposes of this disclosure, a wireless technology may include but is not limited to, IEEE 802.15-based wireless communication, Zigbee® communication, INSTEON communication, X10 communication protocol, Z-Wave® communication, Bluetooth® communication, Wi-Fi® communication, IEEE 802.11-based communication, WiMAX® communication, IEEE 802.16-based communication, various proprietary wireless communications, other suitable wireless communication protocols whether now known or hereinafter developed, or any combination thereof.

Figure 1:
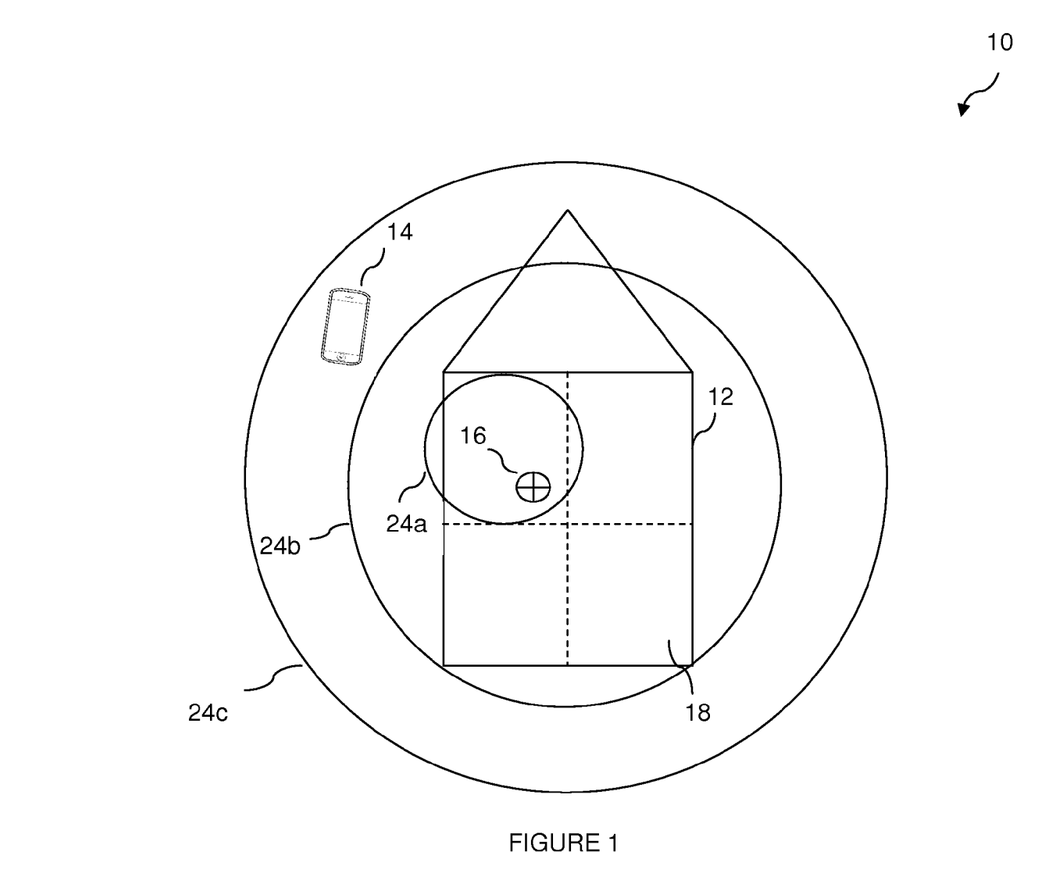
FIG. 1 is an illustration of an home management system in accordance an aspect of with the present disclosure.

FIG. 1 is an illustration of a home management system 10 for a home 12 in accordance with the present disclosure. According to an aspect of the disclosure, the home management system 10 can include a first network device 14 and a sensor 16 which controls and monitors regions or zones 18 within a home 12 such as an individual room based on the user's presence within the home 12. The home management system 10 may also include a second network device 22 (shown in FIG. 3).

The first network device 14 may be, but is not limited to, a smart phone, a smart device such as a tablet, a laptop, or a watch. The first network device 14 may have at least one first communication module 20 that allows for communication via a wireless technology with the sensor 16. For instance, a smart phone such as an iPhone®, an Android® phone, or a Samsung Galaxy Gear Smartwatch® may be equipped with Bluetooth® 4.0 or near field communication (NFC). Additionally, the first network device 14 can include an application which can communicate with the sensor 16 or alternatively allow communication from the sensor 16.

According to an aspect, the sensor 16 may be, but is not limited to, a proximity sensor 16 or beacon configured to detect a user's presence within the home 12. According to another aspect, the sensor 16 may be further configured to detect a user's presence within a room of the home 12. The sensor 16 may also be configured to detect different users within the home 12 or within different rooms or areas. The sensor 16 may also be an iBeacon®. The sensor 16 may include at least one sensor communication module 21 that allows for communication via a wireless technology with the first network device 14 and the second network device 22. For example, the sensor 16 may be equipped with Bluetooth® 4.0, NFC, and/or Wi-Fi® capabilities or any other wireless communication capabilities. Additionally, the sensor 16 may use Bluetooth® 4.0 or NFC to communicate with the first network device 14 or the application disposed thereon and may use Wi-Fi® or any other wireless communication capabilities to communicate with the second network device 22. The sensor 16 may also use the at least one sensor communication module 21 to communicate with another sensor 16 via the wireless technology or with a network of second network devices 22 such as, but not limited to a thermostat, a television, lights, fans, and automatic curtains. A more detailed description of the sensor 16 is provided below. According to an aspect, a method device can include one or more of the following: a personal computer, a PDA, a consumer electronic device, a media device, a smart phone, a cellular or mobile phone, a smart device, a tablet, a television, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device.

Additionally, an exemplary zone 18 is shown in FIG. 1. According to an aspect, the zone 18 may be a room located within the home 12. For example, a zone 18 could be configured to encompass a master bedroom, a living room, a kitchen, or any combination thereof. The sensor 16 may define the zones 18. Alternatively, the configuration of the zones 18 could be defined by one of the network devices 14, 22. As shown in FIG. 1, a single sensor 16 could be utilized to define multiple zones 18. Alternatively, each zone 18 could employ its own sensor 16. The sensor 16 can monitor the zone 18 and detect if the user is present within the zone 18. According to an aspect, the sensor 16 can detect the individual's presence by detecting the presence of the first network device 14. The communications between the first network device 14 and the sensor 16 will be discussed in more detail below.

Each zone 18 may be further defined by a proximity boundary 24 also known as a geofence or range. The proximity boundaries 24a, 24b, 24c can dictate the furthest distance that the first network device 14 may be from the sensor 16 and still be detected by the sensor 16. For example, FIG. 1 shows a first proximity boundary 24a having a first diameter and encompassing the zone 18 in which the sensor 16 is located, a second proximity boundary 24b having a second diameter that is greater than the first diameter of the first proximity boundary 24a and encompasses the home 12, and a third proximity boundary 24c having a third diameter that is greater than the second diameter of the second proximity boundary 24b and encompassing an area surrounding the home 12 which may include other homes 12. Additionally, a zone 18 may include areas such as a garage or driveway. In regards to the present disclosure, the sensor 16 may detect the first network device 14 when the first network device 14 is in the first proximity boundary 24a. In other words, the sensor 16 can detect the first network device 14 when the first network device 14 is in the zone 18 or room within the home 12 in which the sensor 16 is located. If the first network device 14 is in another room within the home 12 than the zone 18 where the sensor 16 is located, then the first network device 14 will not be detected by the sensor 16. The sensor 16 may also have various levels of control within the first proximity boundary 24a. In other words, different actions may occur in different ranges depending on how far the user is from the sensor 16. Specifically, different actions may occur when the user is touching the sensor 16, the user is within close range (6 inches) from the sensor 16, the user is within a medium range (1-2 meters) from the sensor 16, or the user is within a long range (>2 meters) from the sensor 16.

Figure 2:
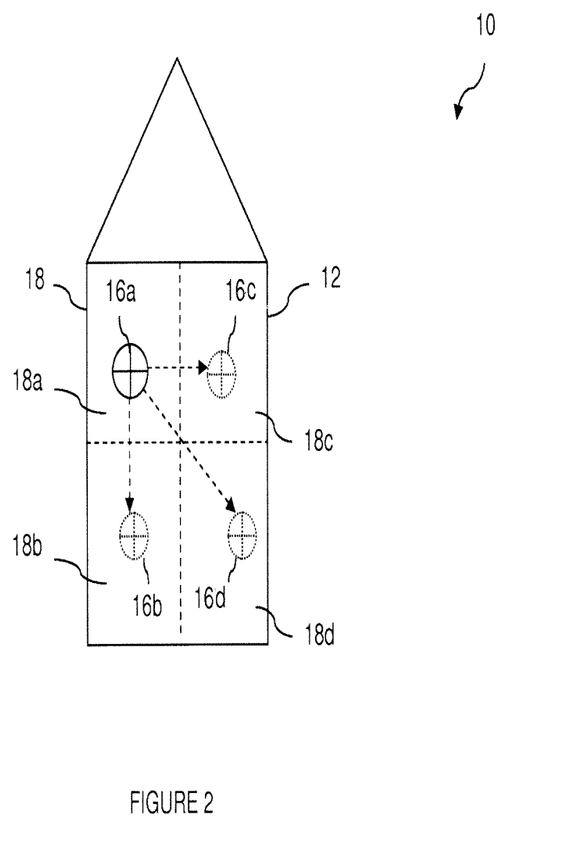
FIG. 2 is an illustration of another example of an home management system in accordance with another aspect of the present disclosure.

FIG. 2 is another illustration of the home management system 10 for a home 12 in accordance with the present disclosure. Similar to FIG. 1, a home 12 having multiple zones 18a, 18b, 18c, and 18d is provided. As shown, each zone 18a, 18b, 18c, 18d can be equipped with respective sensors 16a, 16b, 16c, and 16d. The user may have the ability to designate one of the sensors 16a, 16b, 16c, 16d as the default sensor 16. According to an aspect, the user can change which of the sensors 16a, 16b, 16c, 16d is the default sensor 16. In each of the zones 18a, 18b, 18c, 18d the sensors 16a, 16b, 16c, and 16d, as described with respect to FIG. 1, may be proximity sensors or beacons configured to detect a user's presence within the home 12. The sensors 16a, 16b, 16c, 16d may further be configured to detect a user's presence within each of the zones 18a, 18b, 18c, and 18d of the home 12. Additionally, the sensors 16a, 16b, 16c, 16d may each be an iBeacon®. However, a variety of other sensors 16 may be employed.

The sensors 16a, 16b, 16c, 16d may each be equipped with the sensor communication module 21 that allows for communication via at least one wireless technology. The sensors 16a, 16b, 16c, 16d can communicate with the first network device 14 or the application disposed thereon. The default sensor 16 may also be capable of controlling and monitoring the other sensors 16. Specifically, default sensor 16 may set field strength or the proximity boundary 24 of the other sensors 16 and the sensors 16a, 16b, 16c, 16d may work together and act as a network communicating with each other or communicating with various multiple network devices 14, 22. Alternatively, each sensor 16a, 16b, 16c, 16d may set its own field strength or the proximity boundary 24.

Figure 3:
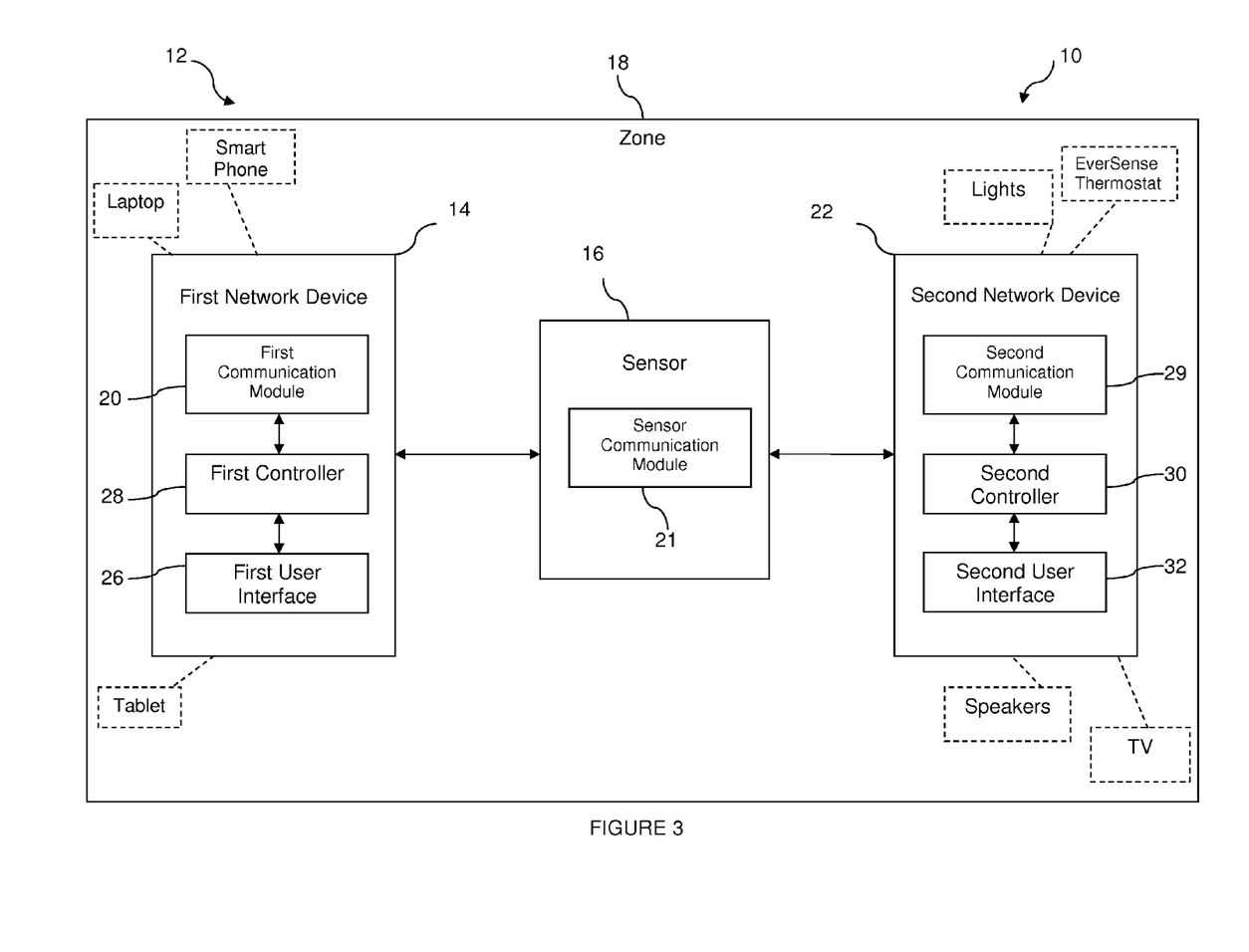
FIG. 3 is a block diagram of an home management system in accordance with an aspect of the present disclosure.

With respect to FIG. 3, a block diagram of the home management system 10 in accordance with the present disclosure is provided. The home management system 10 can include the first network device 14. As described above, the first network device 14 may have at least one first communication module 20 to communicate with the sensor 16 via at least one wireless technology.

Additionally, the first network device 14 may have a first user interface 26 such as a touch screen with a graphical user interface (GUI). The first user interface 26 may have an LCD screen or push buttons which may be employed by touch or voice command or any other appropriate method. Other suitable displays, screens or GUI's may be employed. Specifically, the first user interface 26 of the first network device 14 may be used in conjunction with the application for controlling a home network on the first network device 14. The application may be downloadable or may be preprogrammed within the first network device 14. The application may also have downloadable or hard-coded upgrades which may include, but is not limited to, software updates and additions to the types of devices that may be used in conjunction with the application and sensor 16.

The first user interface 26 may be used to select or program the sensor 16 for use in the home management system 10. Additionally, the first user interface 26 may be used to select or program a plurality of sensors 16 to be used including the default sensor 16. Moreover, the first user interface 26 may be used to set the boundary of the zone 18 corresponding to the selected sensors 16a, 16b, 16c, and 16d. The first user interface 26 may also be used to set a first setting such as an energy saving setting utilized when the user is outside of the zone 18 and may be used to set a second setting such as a comfort setting when the user's presence is detected within the zone 18. Furthermore, the first user interface 26 may be used to select a third setting or more settings such as a sleep mode setting to be used during nighttime when the user's presence is detected within the home 12, a daytime mode setting to be used during specified hours of the day, or an evening mode setting to be used during specified hours of the evening. The first network device 14 may store the settings selected via the user interface in the memory of the first network device 14 and may be configured to automatically create a schedule. A variety of different settings may be implemented, including a home setting, an away setting, or a vacation setting.

The first network device 14 may also have a first controller 28 for generating a first signal indicative of instructions for controlling the second network device 22. The first signal may include instructions for adjusting a setting of the second network device 22 when a user's presence is detected within the home 12. According to an aspect, the first network device 14 may be a smart phone such as an iPhone®, Android®, or Samsung Galaxy Gear Smartwatch®, a smart device, or a computer.

According to an aspect, the first network device 14 can be a smart phone and may have an application for controlling the second network device 22 when the user's presence is detected within the home 12, specifically within the zone 18 or room that a user is within. The application may be a temperature controlling application where the first user interface 26 may be used to set a first temperature such as an energy saving temperature utilized when the user is outside of the zone 18 and may be used to set a second temperature such as a comfort temperature utilized when the user is within the zone 18. Additionally, the first user interface 26 may be used to select a third temperature or a sleep mode temperature to be used at nighttime when the user is within the home 12.

According to another aspect, the first user interface 26 and the application for controlling a home network may be used to program the number of zones 18 and program a network of second network devices 22 corresponding to those zones 18. The network of second network devices 22 may utilize certain settings when the user is detected within the zone 18.

For example, in addition to changing the temperature from the energy saving mode to the comfort mode, the user may also program the television and lights to turn ON when the user's presence is detected within a living room. In another example, these settings may be stored in the memory of the first network device 14 which may be read each time the user is detected within the zone 18. These settings can be stored in a variety of other suitable locations such as on the first controller 28 associated with the home 12 or on a cloud server.

The first controller 28 may have any combination of memory storage such as random-access memory (RAM) or read-only memory (ROM), processing resources or a microcontroller or central processing unit (CPU) or hardware or software control logic to enable management of a first controller 28. Additionally, the first controller 28 may include one or more wireless, wired or any combination thereof of communications ports to communicate with external resources as well as various input and output (I/O) devices, such as a keyboard, a mouse, pointers, touch controllers, and display devices. The first controller 28 may also include one or more buses operable to transmit communication of management information between the various hardware components, and can communicate using wire-line communication data buses, wireless network communication, or any combination thereof. As discussed above, the first controller 28 may be configured to store the selections made using the first user interface 26 on the first network device 14 such as selecting and programming the sensor 16 or the plurality of sensors 16 to be used in conjunction with the home management system 10. Additionally, the first controller 28 may be configured to store the zones 18 selected via the first network device 14 corresponding to the sensors 16 recognized by the first network device 14. The first controller 28 may also be configured to store the first temperature selected via the first user interface 26 as well as store the second temperature selected via the first user interface 26 in memory and creates a schedule.

As described above, the at least one wireless technology of the first network device 14 may include Bluetooth® 4.0 also known as Bluetooth® low energy (Bluetooth® LE or BLE). The first network device 14 may also include NFC or a variety of other wireless technologies, as discussed above. It will be appreciated that the network devices or sensors can be configured to employ multiple different wireless technologies.

The home management system 10 may further include the sensor 16, as discussed above. The sensor 16 may be communicatively connected to the first network device 14. The sensor 16 may be equipped with the at least one sensor communication module 21 that allows for communication via at least one wireless technology to communicate with the first network device 14 and the second network device 22. Like the first network device 14, the at least one sensor communication module 21 of the sensor 16 may include the wireless technologies described above. Additionally, the at least one wireless technology may be NFC or Bluetooth® LE. With NFC, a setting or condition, for example a temperature for a room, may be written into the memory of the NFC device or sensor 16 and then that setting or condition may be transmitted to the first network device 14. The first network device 14 may then upload the setting or condition to a second network device 22, which will be described in more detailed below. Whereas with Bluetooth®, the condition may be broadcast to the first network device 14, the second network device 22, or both. In accordance with an aspect, the setting or condition may be a temperature for a room, the first network device 14 may be a mobile phone, and the second network device 22 may be an EverSense® Thermostat. According to another aspect, the second network device 22, such as the EverSense® Thermostat, can include the functionality of the beacon 16. Put another way, the beacon 16 and second network device 22 can be combined together into one unit.

Additionally, in regards to Bluetooth®, Bluetooth® LE has a range of 160 feet and operates at a speed of 0.3 MBps. Furthermore, Bluetooth® LE operates using a Star network topology which is a known network used between multiple network devices 14, 22 and has an unlimited number of nodes for connections to the network devices 14, 22, a security network of 128-bit AES, and a battery life of approximately three to four years. Alternatively, Bluetooth® Classic or Bluetooth® Zigbee may be used as a substitute for Bluetooth® LE.

In operation, Bluetooth® LE also may utilize a peripheral device and a central device as well as a packet such as an advertising packet or a data packet to transmit data. In establishing a connection between the peripheral and central devices, the peripheral sends out data to alert or broadcast to the central device of the peripheral's presence. This may last from about 20 milliseconds to about 10.28 seconds. But, typically detection occurs in about 1 second. The central device detects the data and transmits a connection request to the peripheral device. The peripheral device accepts the request, the connection is established, and the devices may exchange data. In regards to the home management system 10, the sensor 16 would act as the peripheral device and detect the first network device 14 acting as the central device.

According to an aspect, the sensor 16 may broadcast data representing the presence of the sensor 16. When the user enters the given zone 18 where the sensor 16 is located, the first network device 14, such as a smart phone, may be detected by Bluetooth® and the sensor 16 can attempt to establish a connection. Once the first network device 14 accepts the connection request, the first network device 14 and sensor 16 may communicate with one another and exchange data. Accordingly, when the user leaves the given zone 18, the connection between the first network device 14 and the sensor 16 may be terminated and data is no longer exchanged.

When there is a connection between the first network device 14 and the sensor 16, the sensor 16 may request data or instructions from the first network device 14 for controlling the second network device 22. If the sensor 16 requests data from the first network device 14, the first network device 14 may respond by transmitting a first signal indicative of instructions for controlling the second network device 22 to the sensor 16. For instance, when the user enters the zone 18 where the sensor 16 is located and if the first network device 14 is in a sleep mode, the sensor 16 may awaken or may activate the application for controlling the second network device 22 and the first network device 14 may transmit instructions for controlling the second network device 22.

Alternatively, the first network device 14 on its own accord may transmit the first signal indicative of instructions for controlling the second network device 22 when the sensor 16 detects the user's presence. According to an aspect, the first network device 14 may be a smart phone; when the user enters the zone 18 with their smart phone, the smart phone may send instructions or information to adjust the temperature of the room to the comfort temperature or second setting chosen by the user previously. According to another aspect, the smart phone may send instructions to the sensor 16 for turning the lights ON. According to a further aspect, the smart phone may send instructions to the sensor 16 for both adjusting the zone 18 temperature and turning on the lights.

According to an aspect, the rate at which the sensor 16 broadcasts information can be adjusted up or down to save battery life. This may be adjusted based on the proximity of the application of the first network device 14. The first network device 14 may send a signal to the second network device 22 which in turn can communicate with the sensor 16 to adjust the broadcast rate.

In addition to Bluetooth® LE, the sensor 16 may also be equipped with another wireless technology for communication between the sensor 16 and the second network device 22 such as Wi-Fi® or Bluetooth® LE communication. In other words, the sensor 16 may communicate directly with the second network device 22. Once the sensor 16 receives the first signal instructing the second network device 22 to adjust the first setting to the second setting, the sensor 16 may use another wireless technology such as Wi-Fi® or Bluetooth® LE communication to send a second signal including instructions for adjusting the first setting to the second setting to the second network device 22.

Additionally, the sensor 16 may have a switch (not shown) for delaying transmission of the second signal indicative of instructions for adjusting or controlling the second network device 22. The switch may include an off switch where there is no delay, a six hour delay where the second signal would not be transmitted for six hours, an eight hour delay, a twelve hour delay, an infinite delay, or another delay of a specific amount of time set by the user. Additionally, the sensor 16 may have a timer to keep track of the time passed when using the delays. Alternatively, the sensor 16 may utilize the first network device 14 to keep track of the time passed when using the delays.

As described above, the sensor 16 may be a plurality of sensors 16. In other words, a plurality of sensors 16 may each be equipped with sensor communication modules 21 that allows for communication via at least one wireless technology. One of the plurality of sensors 16 may be designated the "default" using the application on the first network device 14. In designating the default sensor 16 via the application of the first network device 14, the application may detect and register each sensor 16. Multiple users may correspond with each sensor 16 or each sensor 16 may have the capability to detect multiple user's presences. The application may also display each sensor 16 on the user interface of the first network device 14 in a table view to show where each sensor 16 is located within the home 12. If the sensor 16 selected by the user is not found, the first sensor 16 detected may become the default sensor 16. Additionally, the default sensor 16 may be selected through a list provided by the application and displayed on the user interface.

Alternatively, one of the plurality of sensors 16 may be designated the "default" sensor 16 automatically when the zones 18, the sensors 16 corresponding to the zones 18, the second network device 22, the first setting, and the second setting are set or programmed using the first network device 14. Furthermore, the plurality of sensors 16 could be preprogrammed in a kit or may be programmed separately as discussed above. Additionally, the sensors 16 may be identified by a name or description which may be preprogrammed within the sensor 16 or may be given a name by the user.

The default sensor 16 or the plurality of sensors 16 individually may also set field strength or the proximity boundary 24 and may act together as a network communicating with each other or communicating with multiple devices. More specifically, the plurality of sensors 16 may work together and detect when the user travels from one zone 18 to another. For instance, this can occur if the user is traveling from a living room where the default sensor 16 or first sensor 16 is located to the kitchen where the second sensor 16 is located. When the user enters the kitchen, the second sensor 16 may communicate directly with the second network device 22 such as light fixtures. The light fixtures may be turned ON when the user enters the kitchen while the light fixtures within the living room may be turned OFF. The second sensor 16 may directly transmit the second signal indicative of instruction for controlling the light fixtures within the kitchen or the second sensor 16 and may communicate with the default or first sensor 16 which in turn communicates with the light fixture within the kitchen. As discussed above, the plurality of sensors 16 may each be a proximity sensor 16 or beacon for detecting a user's presence within the home 12, or may be an iBeacon®.

The plurality of sensors 16 together or individually may have the capability of controlling and adjusting settings on the second network device 22, instead of the second network device 22 adjusting from the first setting to the second setting itself. For example, while temperatures may be set and adjusted at the second network device 22 or on the thermostat itself, according to another aspect, the sensor 16 may instead set the temperatures and adjust that temperature when the user's presence is detected within the home 12.

According to still another aspect, the sensor 16 may be placed within a given zone 18 and when the user is located in that zone 18, the first network device 14 may receive advertisements related to that zone 18. In other words, the sensor 16 directly adjusts the second network device 22. For example, the sensor 16 may be placed in a kitchen and when the user's presence is detected within the kitchen, advertisements may be sent to the first network device 14 regarding coupons for grocery shopping.

Additionally, the sensor 16 may further learn and adapt to different behaviors as a result of the user's preferences after a desired amount of time. For example, if the user typically dims the lights within a given zone 18 when they select a movie or TV show on the television or media center, the sensor 16 may automatically dim the lights within that zone 18 when the user selects to view a movie or TV show.

The sensor 16 is not limited to standard functions within the home 12 such as dimming lights but may also be used for recreational uses or in conjunction with children's toys such as for scavenger hunts where the user would walk into a room where various types of treasures may be found and displayed on the first network device 14.

As mentioned above, the home management system 10 can also include the second network device 22 which is communicatively connected to the sensor 16. Similar to the first network device 14, the second network device 22 may also have at least one second communication module 29 that allows for communication via the at least one wireless technology. The second network device 22 can receive the second signal indicative of instructions for controlling the second network device 22. The at least one wireless technology may be, but is not limited to Wi-Fi® communication to permit communication between the sensor 16 and the second network device 22.

According to another aspect, the second network device 22 may have the sensor 16 located therein. In other words, the second network device 22 may act as the sensor 16 itself and detects the user's presence within the zone 18.

Additionally, the second network device 22 may have a second controller 30 which adjusts the second network device 22 from the first setting to the second setting and vice versa when the second network device 22 receives the second signal from the sensor 16. The second network device 22 may be an EverSense™ Thermostat or smart thermostat having Wi-Fi® communication. After the sensor 16 detects the user's presence and transmits the second signal with instructions to adjust from the first temperature to the second temperature, the thermostat may receive the second signal via Wi-Fi® communication and the thermostat's second controller 30 can adjust the temperature in that zone 18 from a first temperature or an energy saving temperature such as sixty degrees to a second temperature or a comfort temperature such as sixty-eight degrees. When the user's presence is no longer detected by the sensor 16, the thermostat may change from the comfort temperature to the energy saving temperature. According to other aspects, the second network device 22 may be, but is not limited to, a light fixture (inside or outside of the home 12), a television, a surface glass, a MP3 player or a media center, speakers, or a digital grocery list.

The second controller 30 of the second network device 22 may have any combination of memory storage such as random-access memory (RAM) or read-only memory (ROM), processing resources or a microcontroller or central processing unit (CPU) or hardware or software control logic to enable management of a second controller 30. Additionally, the second controller 30 may include one or more wireless, wired or any combination thereof of communications ports to communicate with external resources as well as various input and output (I/O) devices, such as a keyboard, a mouse, pointers, touch controllers, and display devices. The second controller 30 may also include one or more buses operable to transmit communication of management information between the various hardware components, and can communicate using wire-line communication data buses, wireless network communication, or any combination thereof.

The second network device 22 may further include a second user interface 32. The user interface 32 may be used for selecting different functions within the second network device 22. According to an aspect, the second user interface 32 may be used to select and adjust temperatures within the home 12. Moreover, the second user interface 32 may be used for other functions offered by the thermostat such as offering energy saving information or streaming music. In another embodiment, the second network device 22 may be a smoke detector. The smoke detector may have a sensor 16 located therein, which may control, adjust, or activate the smoke detector when a user is detected within the zone 18.

Pursuant to a further aspect, the second network device 22 may be a television or a media center, which may be turned ON or OFF when the first network device 14 is detected by the sensor 16. The first network device 14 and the sensor 16 may also have the ability to tune stations, preset volume, and launch Hulu®, Netflix®, or a DVR. The sensor 16 may be located anywhere within the zone 18 where the television or media center is located or may be located on the television or media center. Alternatively, the television or media center may be turned ON when the first network device 14 is placed next to the sensor 16 and the first network device 14 may act as a remote control by using a remote control application to control the television or media center.

According to another aspect, the second network device 22 may be surface glass which would create personalized displays based on the user's preferences or profile. The surface glass can display a picture, video, or anything the user selected via the first network device 14 when the user is detected within the zone 18.

In accordance with another aspect, the second network device 22 may be an MP3 player, speakers, or stereo system which may be turned ON when the user is detected within the zone 18. Additionally, the music played by the MP3 player, speakers, or stereo system may be changed based on the type or user preferences selected on the first network device 14 when the user is detected within the zone 18. The sensor 16 may also be placed next to the speaker to turn on music automatically.

According to a further aspect, the second network device 22 may be lights located within the home 12. The lights may have a first setting of OFF and a second setting of ON. When the user's presence is detected within the room the lights may automatically turn ON. The lights may have a third setting of DIM which may be programmed to be used at any given time or when the user's presence is detected within the room. In another example, the sensor 16 may be located within a light switch, which may turn the light ON, OFF, or DIM when the user's presence is detected. The DIM feature may also be controlled via an application on the first network device 14 when the user's presence is detected within the zone 18. Additionally, in adjusting or controlling light, music, or other content, the sensor 16 may be able to detect a gyro handset or gestures made by hand or using the first network device 14. For instance, lights may be dimmed by the user lowering their hand. Volume may be increased by the user raising their hand or content may be selected by the user moving their hand left and right.

In a related example, the user may walk by the sensor 16 to turn the lights ON or OFF. Additionally, when the user walks into the home 12 and by the sensor 16 for the first time the content such as a message left by another user may be displayed on the first network device 14. In another related example, the second network device 22 may be light fixtures located outside the home 12, which may be turned ON when the user approaches the home 12 or garage.

According to a still further aspect, the second network device 22 may be a digital grocery list. The digital grocery list may be created or updated via the first user interface 26 of the first network device 14 or through voice command of the sensor 16 or the first network device 14.

Figure 4:
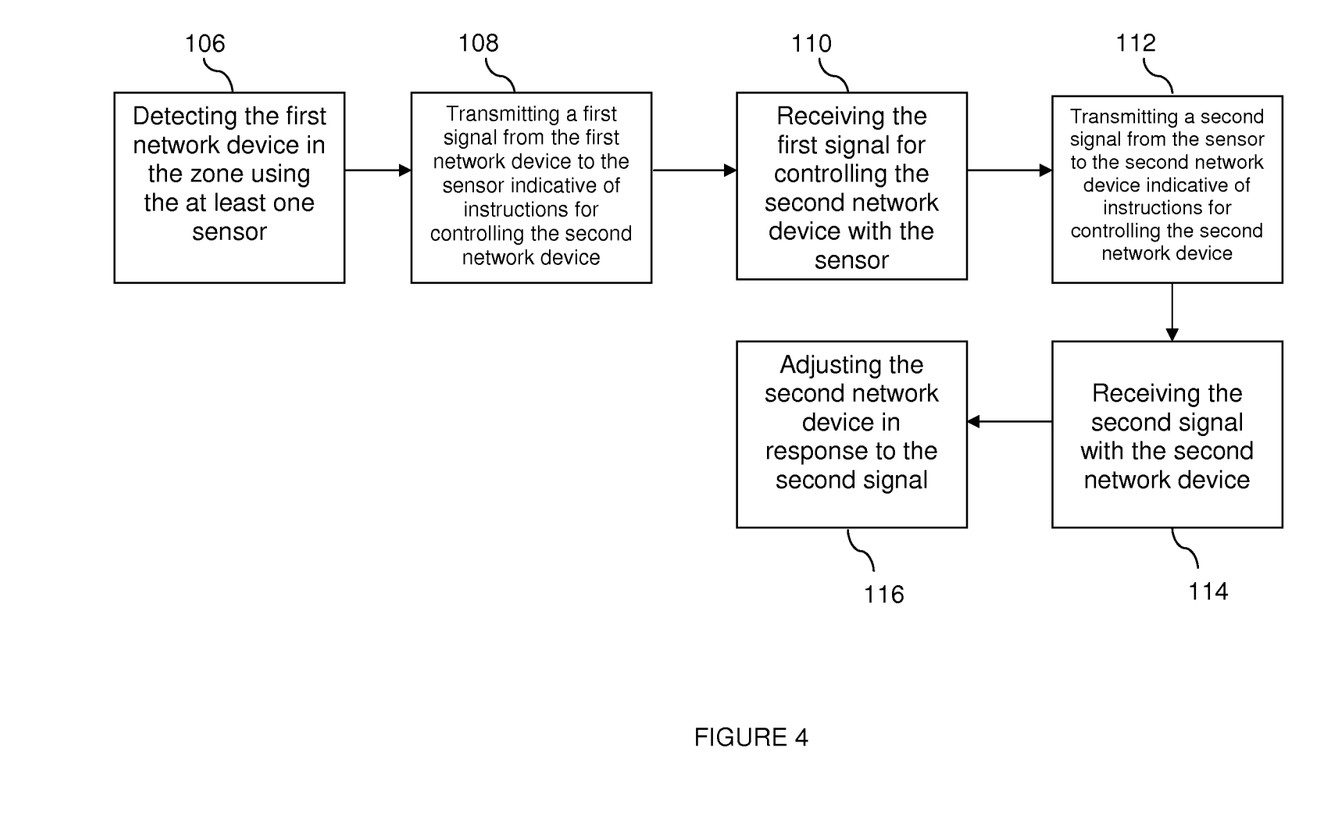
FIG. 4 is a flowchart of a method of managing a home management system in accordance with an aspect of the present disclosure.

With respect to FIG. 4, a flow chart of a method of managing a home management system 10 is provided. The method includes the step 100 of selecting and storing at least one zone 18 using the first network device 14. The at least one zone 18 being a room within the home 12 such as a living room or a bedroom. As disclosed above, the first network device 14 has the at least one first communication module for communication via at least one wireless technology, as described above with respect to FIGS. 2 and 3. The at least one wireless technology may include Bluetooth® LE.

The method further includes the step 102 of detecting at least one sensor 16 corresponding to the zone 18 selected and 103 programming the first network device 14 to recognize the sensor 16 within the zone 18 selected by the first network device 14. For instance, the first network device 14 may detect the sensor 16 placed in the kitchen. The first network device 14 must then be programmed to recognize that sensor 16 as belonging to the kitchen. The at least one sensor 16 has the sensor communication module for communication via the at least one wireless technology as described above with respect to FIGS. 2 and 3. The at least one wireless technology of the at least one sensor 16 may include Bluetooth® LE and 802.11-based or Wi-Fi® communication. The at least one sensor 16 may communicate with the first network device 14 using Bluetooth® LE. In detecting the at least one sensor 16, the sensor 16 sends out data to alert or broadcast its presence. The first network device 14 detects the data and transmits a connection request to the sensor 16. Once the connection request is accepted, the first network device 14 and the sensor 16 may communicate with one another. However, the first network device 14 and the sensor 16 may only communicate with each other when the first network device 14 is in that zone 18.

FIG. 4 further illustrates the step 104 of storing a first setting on the first network device 14 corresponding to the zone 18 selected. According to one aspect, the first setting may be a first temperature such as an energy saving temperature utilized when the user is outside of the zone 18. The second setting may also be stored on the first network device 14. According to another aspect, the second setting may be a second temperature such as a comfortable temperature utilized when the user is detected within the zone 18. The first setting and second setting may be adjusted on the first network device 14 at any time. Additionally, a third setting may be selected and stored on the first network device 14 for establishing a nighttime mode when the user is detected within a given zone 18 during nighttime. According to a further aspect, a third temperature may be set and stored on the first network device 14 for use when the user is detected within the zone 18 during nighttime.

The method further includes the step 106 of detecting the first network device 14 in the zone 18 using the at least one sensor 16. In detecting the first network device 14, the next step 108 is transmitting a first signal from the first network device 14 to the sensor 16 indicative of instructions for controlling the second network device 22. The method proceeds by 110 receiving the first signal for controlling the second network device 22 with the sensor 16 and then 112 transmitting a second signal from the sensor 16 to the second network device 22 indicative of instructions for controlling the second network device 22. This is done via the at least one wireless technology. The next step is 114 receiving the second signal with the second network device 22. This is also done via the at least one wireless technology. The method also includes the step of 116 adjusting the second network device in response to the second signal. More specifically, this may include adjusting the first setting to the second setting within the zone 18 where the user's presence is detected. The second network device 22 may further adjust from the second setting to a third setting and so on. Additionally, when the user's presence is no longer detected, the second network device 22 adjusts the second setting to the first setting or another setting which may be an energy mode.

For example, the first network device 14 may be a smart phone having Bluetooth® LE and the second network device 22 may be a smart thermostat having Wi-Fi® communications. When the user is within a zone 18 such as the living room the smart phone transmits the first signal indicative of instructions for controller of the thermostat based on the user's presence using Bluetooth® LE to the sensor 16. The sensor 16 receives the first signal indicative of instructions also using Bluetooth® LE and transmits a second signal indicative of the user's presence using Wi-Fi® to the smart thermostat. The thermostat receives the second signal and adjusts the first temperature (an energy saving temperature) to the second temperature (comfort temperature). Additionally, when the smart phone is no longer detected within the zone 18, the thermostat may adjust the second temperature to the first temperature. Moreover, the method may also incorporate any of the aspects disclosed by FIG. 3 including but not limited to the first network devices 14, the application, the sensors 16, and the second network devices 22.

As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

While examples of the disclosure have been illustrated and described, it is not intended that these examples illustrate and describe all possible forms of the disclosure. Rather, the words used in the specification are words of description rather than limitation, and it is understand that various changes may be made without departing from the spirit and scope of the disclosure. Additionally, the features and various implementing embodiments may be combined to form further examples of the disclosure.

What is claimed is:

1. A system comprising:
a thermostat disposed at a site and configured to:
wirelessly communicate with a mobile device,
implement an energy saving setting when the mobile device is outside of a boundary encompassing the site, and
implement a comfort setting when the mobile device is within the boundary encompassing the site;
a first sensor disposed within a first room of the site and configured to:
detect a presence of a user within the first room of the site, and
control the thermostat in response to the detected presence of the user within the first room; and
a second sensor disposed within a second room of the site and configured to:
detect the presence of the user within the second room of the site,
control the thermostat in response to the detected presence of the user within the second room,
wherein one of the first sensor or the second sensor is designated by the user as a default sensor and configured to control and to monitor the other one of the first sensor or the second sensor, and
wherein at least one of the first sensor and the second sensor configured to broadcast information at an adjustable rate to conserve power.

2. The system of claim 1, wherein the boundary encompassing the site includes a plurality of boundaries and the thermostat is selectively adjustable according to a location of the mobile device relative to each of the plurality of boundaries.

3. The system of claim 1, wherein the mobile device includes an application configured to control the thermostat in response to the detected presence of the user in the first room of the site or the second room of the site.

4. The system of claim 1, wherein the mobile device includes an interface configured to program settings of the thermostat corresponding to the first room and the second room.

5. The system of claim 4, wherein the settings of the thermostat defined by the first user interface and including:

a first setting configured to generate the instructions to control the thermostat in response to the user being outside of said the first room or the second room, a second setting configured to generate the instructions to control the thermostat in response to the user being in the first room or the second room, and a third setting configured to generate the instructions to control the thermostat in response to the user being in the first room or the second room while it is nighttime.

6. The system of claim 5, wherein the first setting is a first temperature utilized when the user is outside the first room or the second room and the second setting is a second temperature utilized when the user is detected within the first room or the second room.

7. The system of claim 1, wherein the thermostat configured to wirelessly communicate with the mobile device by at least one of: IEEE 802.15-based wireless communication, Zigbee communication, INSTEON communication, X10 communication protocol, Z-Wave communication, Bluetooth communication, Wi-Fi communication, IEEE 802.11-based communication, WiMax communication, or IEEE 802.16-based communication.

8. The system of claim 1, wherein each of the first sensor and the second sensor includes a motion sensor.

9. The system of claim 1, wherein the first sensor and the second sensor are configured to wirelessly communicate with at least one second network device to control the at least one second network device in response to the detected presence of the user within the first room and the second room of the site.

10. The system of claim 9, wherein said at least one second network device includes at least one of: a personal computer, a consumer electronic device, a media device, a smart device, a television, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device.

11. The system of claim 1, wherein the first mobile device includes at least one of a PDA, a smart phone, a cellular phone, a mobile phone, or a tablet.

12. The system of claim 1, wherein the at least one of the first sensor and the second sensor configured to broadcast the information at the adjustable rate to conserve power including a battery and the rate adjusted to conserve the battery life.

13. The system of claim 1, wherein the rate at which information is broadcast is further adjusted based on a proximity of the mobile device to the at least one of the first sensor and the second sensor configured to broadcast the information at the adjustable rate.

14. A method of managing a home management system comprising:

associating a mobile device with a thermostat at a home;

detecting a location of the mobile device relative to at least one boundary encompassing the home;

implementing an energy saving setting at the thermostat in response to the mobile device being disposed outside of the at least one boundary encompassing the home;

implementing a comfort setting at the thermostat in response to the mobile device being disposed within the at least one boundary;

associating a first sensor with a first room of a home;

associating a second sensor with a second room of the home;

designating by a user one of said first sensor and said second sensor as a default sensor configured to control and to monitor the other one of said first sensor or said second sensor;

detecting the user within the first room or the second room using the first and second sensors;

transmitting a first signal from the first sensor to the thermostat indicative of a presence of the user presence within the first room;

transmitting a second signal from the second sensor to the thermostat indicative of the presence of the user within the second room;

receiving at least one of the first signal and the second signal at the thermostat;

adjusting the thermostat in response to the received at least one of the first signal and the second signal;

adjusting at least one of a broadcast rate at which the first signal is transmitted from the first sensor and a broadcast rate at which the second signal is transmitted from the second sensor to conserve power.

15. The method of claim 14, further comprising:

associating the first sensor and the second sensor with respective rooms of the home using the mobile device.

16. The method of claim 15, further comprising:

programming the mobile device to recognize the first sensor and the second sensor.

17. The method of claim 14, further comprising:

storing a first setting on the thermostat corresponding to the first room;

storing a second setting on the thermostat corresponding to the second room;

implementing the first setting in response to the first signal; and implementing the second setting in response to the second signal.

18. The method of claim 17, further comprising:

detecting a time;

storing a third setting on the thermostat to be utilized when the user is detected in either the first room or the second room while it is nighttime; and implementing the third setting in response to detecting the user in the first room or the second room while it is nighttime.

19. The method of claim 14, further comprising:

requesting instructions from the mobile device with the first sensor and the second sensor for controlling the thermostat.

20. The method of claim 14, wherein the adjusting at least one of the broadcast rate at which the first signal is transmitted from the first sensor and the broadcast rate at which the second signal is transmitted from the second sensor to conserves a battery life the respective first sensor and the second sensor.

21. The method of claim 14, wherein the adjusting at least one of the broadcast rate at which the first signal is transmitted from the first sensor and the broadcast rate at which the second signal is transmitted from the second sensor based on a proximity of the mobile device to the at respective least one of the first sensor and the second sensor.

* * * * *